Oct. 4, 1938.  P. BARRY  2,132,010
STUFFING BOX PACKING
Filed Jan. 23, 1937
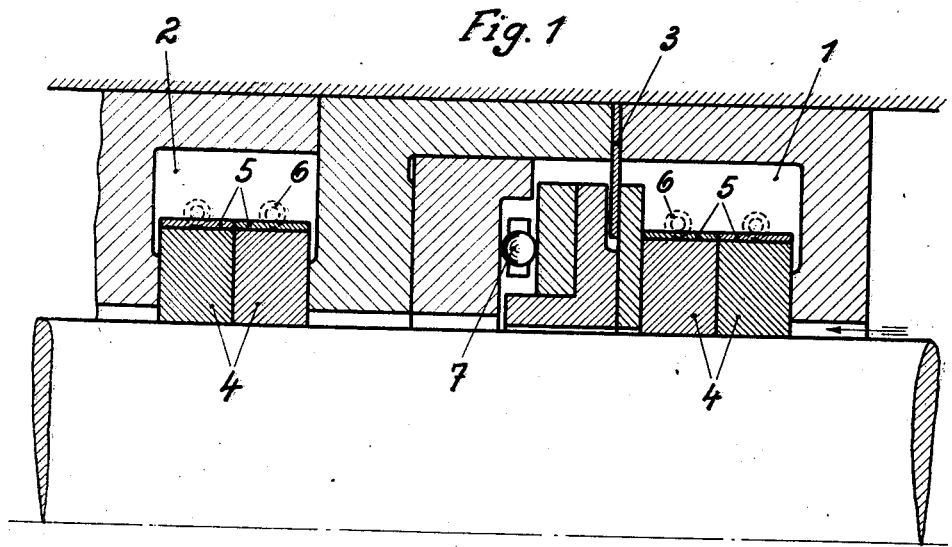
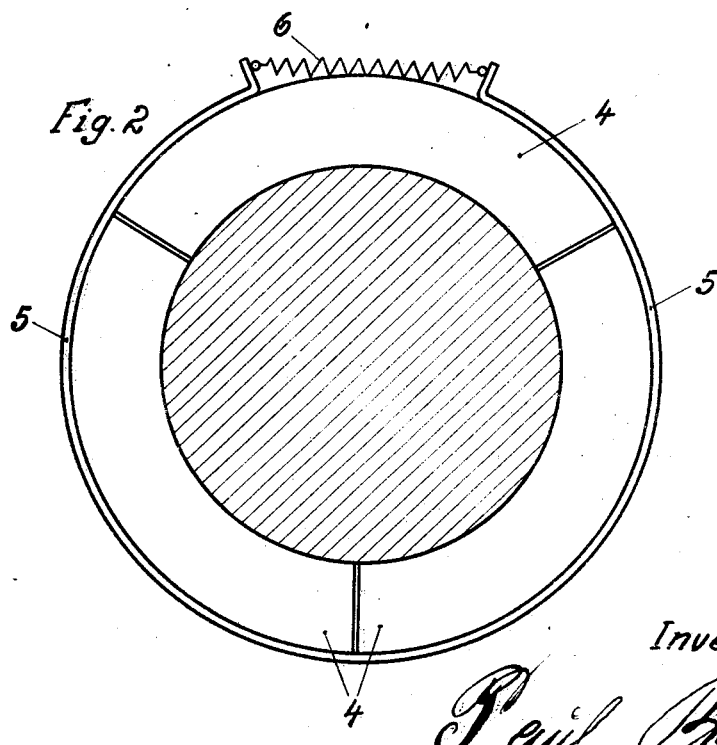
Inventor:
Paul Barry Patented Oct. 4, 1938

2,132,010

UNITED STATES PATENT OFFICE

2,132,010

STUFFING BOX PACKING

Paul Barry, Essen-Ruhr, Germany

Application January 23, 1937, Serial No. 122,026
In Germany June 13, 1936

1 Claim. (Cl. 286—26)

This invention relates to a further development of a metallic packing for stuffing boxes, which is described and claimed in my co-pending application Ser. No. 13,495, filed March 28, 1935, now Patent No. 2,069,056, issued January 26, 1937, and which comprises a plurality of packing rings arranged in one or more chambers of angular cross section, between which an elastic wall is arranged.

It has been found that in packing chambers of this type of stuffing boxes, if the packing rings are pressed against a shaft or piston rod to be packed by tightening means rigidly surrounding them, the rings fail to possess the requisite flexibility in radial direction during the stroke of the shaft or piston rod with the result that they slide with unnecessary hardness on the shaft or rod which are thus subjected to rapid wear.

Furthermore, experience has shown that although harmful pressure is taken up almost completely already in the first chamber which is also protected against the entrance of heat, dirt or the like, this pressure, particularly when sealing against high pressures is concerned, is nevertheless often so great that, owing to the frictional resistance produced, yielding of the packing rings to avoid wear on the shaft or piston rod during fluctuations of the latter is rendered extremely difficult, so that the packing rings in this respect, too, do not possess sufficient mobility.

The object of the invention is therefore to eliminate the difficulties mentioned by providing yielding elastic tension bands for covering also the joints of the divided packing rings and permitting sufficient flexibility thereof in radial direction, and, further, by providing suitable abutments, such as movable ball bearings or the like of any desired construction which are disposed on one side of the elastic wall for taking up axial pressure.

By way of example, the invention is diagrammatically illustrated in the accompanying drawing, in which Fig. 1 is a longitudinal section of a stuffing box packing comprising two chambers, and Fig. 2 a cross section through one of the packing chambers.

Referring to the drawing, 1 is the first packing chamber facing the pressure side and 2 is the second packing chamber, both chambers being formed of pot-like casing members. The elastic wall, which forms the main feature of the co-pending application referred to is designated 3, and 4 refers to the packing rings. According to the invention, the packing rings 4 are surrounded by the tension bands 5 having the same width as the packing rings in such a manner that the bands cover the joints of the multipart packing rings and are joined together by springs 6 to form tension units or bodies. In this manner the tension device is rendered movable and elastic so as to permit yielding of the packing rings 4 to any necessary extent, and in spite of its elasticity it always maintains the same position around the packing rings. As the joints of the packing rings are continually covered by the tension bands, pressure cannot enter the joints.

7 indicates abutments, such as movable ball bearings disposed, according to the invention, in the front application surfaces produced by axial pressure. These ball bearings may be of any desired type to prevent friction at the points of application and to take up the axial pressure acting in the direction of the arrow against the inserted movable parts of the stuffing box, so that at a deflection of the piston rod or shaft to be packed frictional resistances acting in axial direction are no longer, or practically so, present and the inserted movable members can therefore easily follow the fluctuations of the piston rod or shaft by means of the ball bearings 7 while still maintaining their packing pressure. Since according to the construction described in my co-pending application the elastic wall 3 serves for taking up pressurre almost completely already in the first chamber, the ball bearing portions are pressureless, or nearly so, whereby safe operation of the ball bearings is insured.

In stuffing boxes having more than two packing chambers the ball bearings 7 are preferably arranged only between the first and second chambers, since owing to the construction of the movable inserted members of the chamber, as described in the co-pending application, axial pressure is taken up already in front of or in the first chamber, and the other chambers are therefore practically pressureless. It is of course possible to provide ball bearings also between the other chambers.

What I claim, is:

A metallic stuffing box, comprising two pot-like casing members to be placed on the object to be packed, which have contiguous edges, an elastic wall interposed between the two members and dividing the inner space of the casing into two chambers of angular cross section, packing rings placed on the object to be packed within range of one of said chambers and laterally supported by the elastic wall, and a ball thrust bearing arranged on the other side of the elastic wall for taking up axial pressures.

PAUL BARRY.